United States Patent Office 3,486,500
Patented Dec. 30, 1969

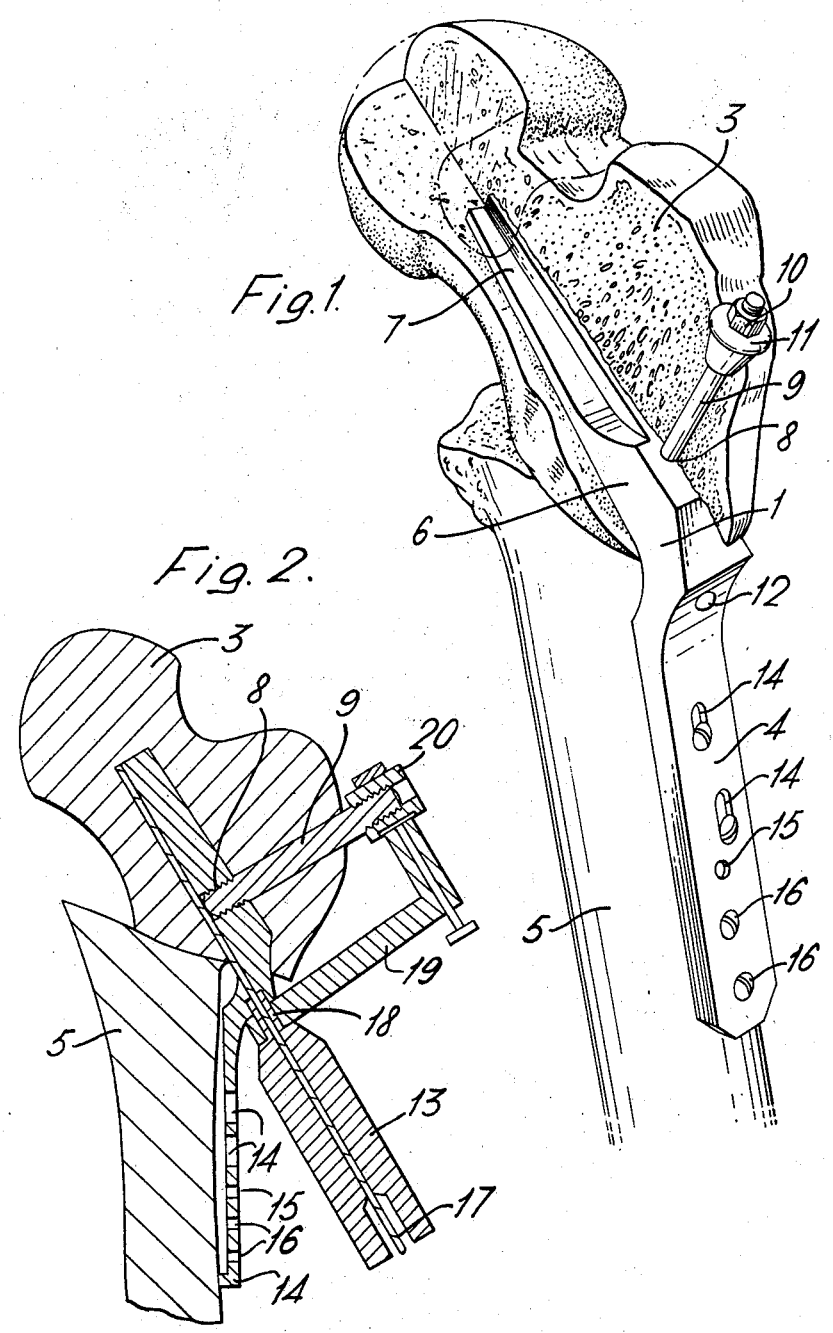

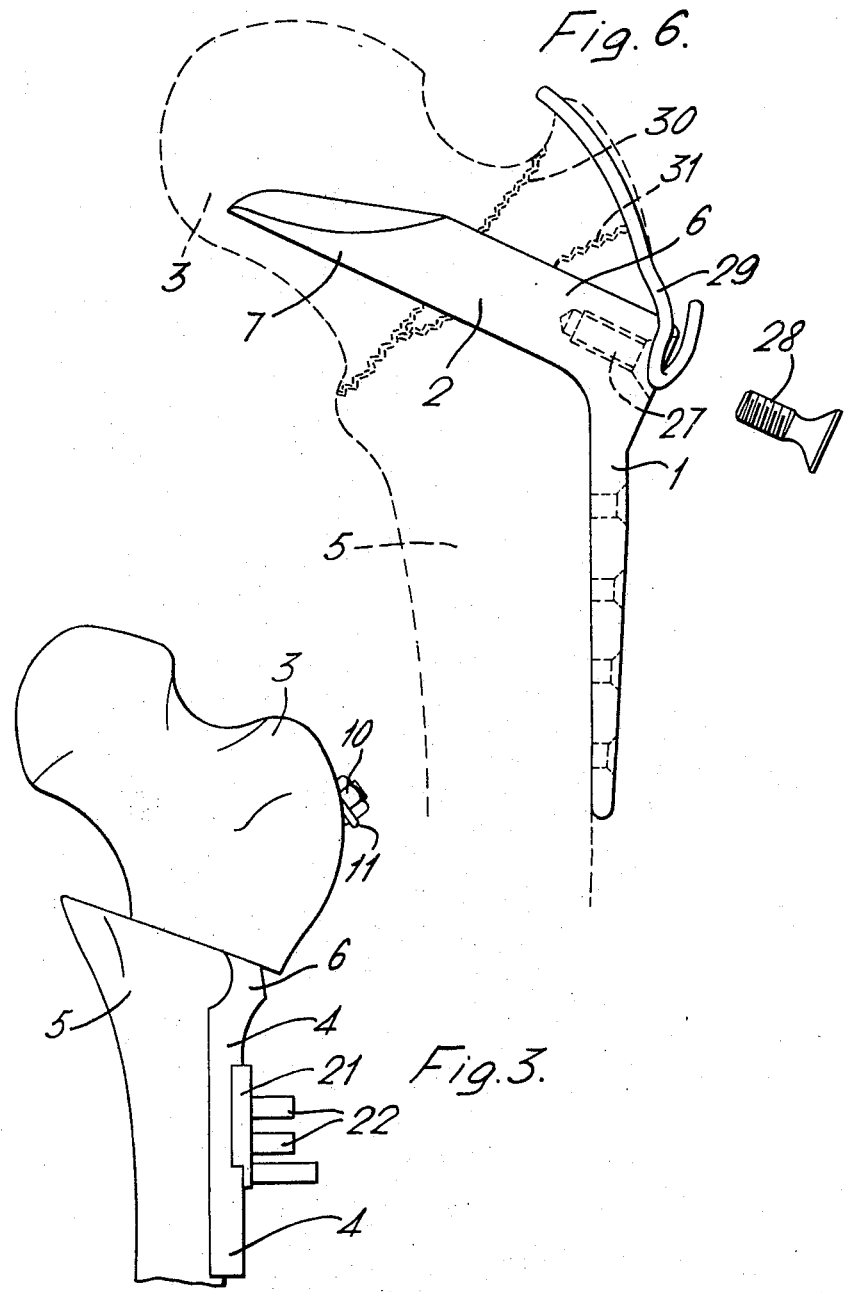

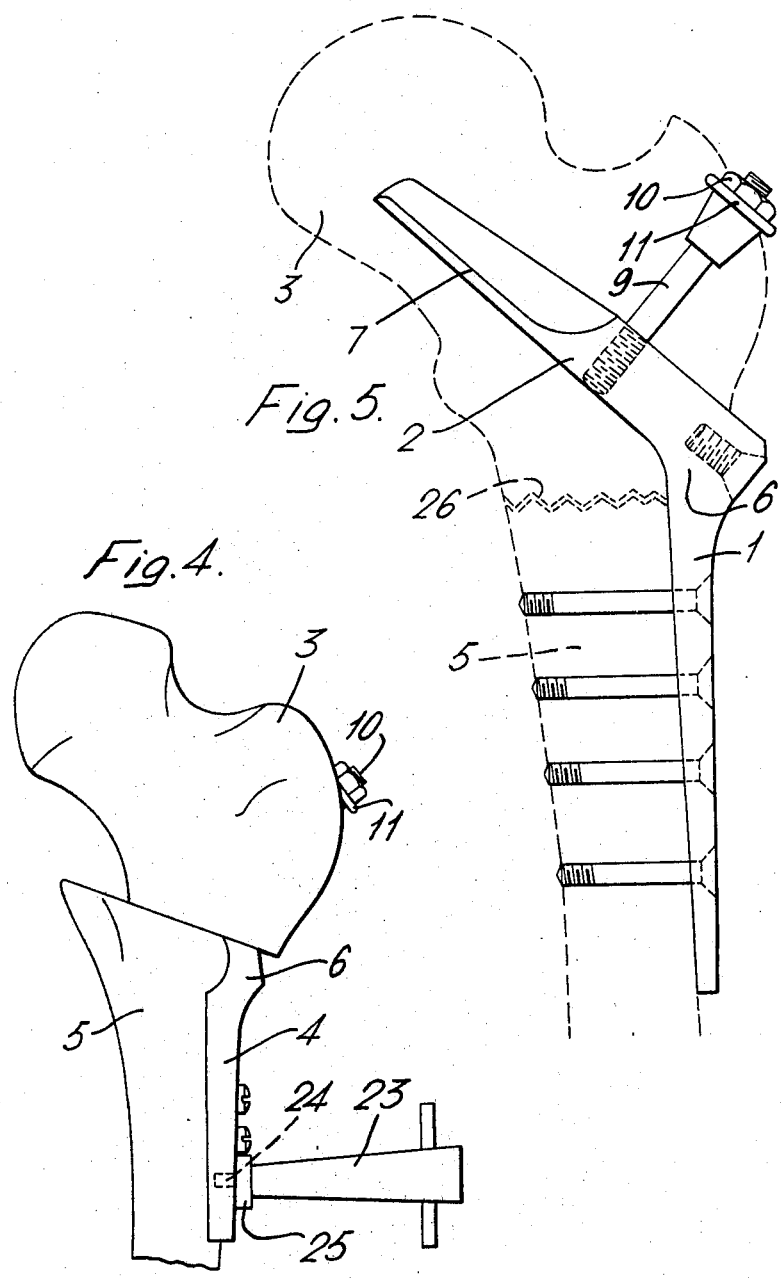

3,486,500
OSTEOTOMY PLATE
Kenneth Ball, Hightown, near Liverpool, and Geoffrey Vaughan Osborne, Southport, England, assignors to National Research Development Corporation, London, England, a British corporation
Filed Sept. 14, 1966, Ser. No. 579,311
Claims priority, application Great Britain, Sept. 17, 1965, 39,826/65
Int. Cl. A61f 5/04
U.S. Cl. 128—92        12 Claims

ABSTRACT OF THE DISCLOSURE

A fixation implant for use in hip surgery including a shank for attachment to the shaft of the femur and a head for insertion into the upper part of the femur, the implant being adapted to have attached to it means for transmitting to the implant the force exerted by the glutial muscles on the greater trochanter.

---

This invention relates to fixation implants for use in hip surgery and in particular to implants for the fixation of the upper part of the femur on the shaft of the femur in displacement osteotomy, and for the fixation of trochanteric and subtrochanteric fractures.

When such fixations are made with the implants prescently used for these purposes they tend to fail by movement to the shaft of the femur and a head for insertion of normal activity, particularly weight bearing, are applied before secure union of the fracture takes place. It is an object of the present invention to provide a fixation implant for use in hip surgery which gives greater protection to a uniting fracture.

Accordingly, the invention provides a fixation implant for use in hip surgery comprising a shank for attachment to the shaft of the femur and a head for insertion into the upper part and neck of the femur, the implant being adapted to have attached to it means for transmitting to the implant the force exerted by the glutial muscles on the greater trochanter. This force may have a magnitude of at least two or three times body weight and may impart a turning moment on the neck of the femur of about 800 lb./in., and the implant according to the invention takes off the force before it can fall on the angle of the implant and cause deflection.

When the implant is designed for use in displacement osteotomy and the fixation of sub-trochanteric fractures the force transmitting means may take the form of a post passing through the greater trochanter and attached to the head of the implant at one end and bearing against the outer region of the greater trochanter at its other end. The head of the implant is adapted to have one end of the post attached to it, for example, by having a screw-threaded hole passing into the head through the surface which is nearer to the greater trochanter when the implant is in position. The post may be screw-threaded at each of its ends so that one end is attached to the implant by insertion into the screw-threaded hole in the head, and the other end may receive a nut and preferably also a specially shaped washer to bear against the outer region of the greater trochanter. When the post is to be inserted a hole must be drilled through the greater trochanter correctly positioned with respect to the hole in the head, after the head has been inserted into the upper part of the femur. The implant, therefore, is preferably adapted to have temporarily attached to it a jig for positioning a drill to drill this hole.

When the implant is designed for use in the fixation of trochanteric fractures the force transmitting means may take the form of a wire passing round the greater trochanter and attached to the implant. The implant is accordingly adapted to have the wire attached to it, for example, by having a hole in the shank adapted to receive a plug to anchor the wire.

The invention also provides a surgical implant for use in hip surgery comprising a shank for attachment to the shaft of the femur and a head for insertion into the upper part and neck of the femur, the head comprising a neck attached to the shank and a wedge-shaped blade, the wider part of the wedge being that part adjacent to the neck. The tapered blade is designed to stabilise the head in the upper part of the femur and prevent it from being driven in further than is desired. Advantageously such implants are also adapted to have attached to them means as described above for transmitting to the implant the force exerted by the gluteal muscles on the greater trochanter.

The shank of the implant may be attached to the shaft of the femur by means of screws. It is preferably adapted to receive pre-loading means to urge the shaft of the femur against the upper part of the femur before the plate is finally secured to the shaft of the femur. For example, screws may be inserted into the shaft of the femur through slots in the shank and partly tightened. The pre-loading means may comprise a cam bearing a peg. The peg is inserted into a hole in the shank below one of the screws so that the cam rests against the head of the screw. The head of this screw is preferably adapted to carry the side load arising from the cam. If the cam is then turned to press against the screw, the plate is urged downwards relative to the shaft of the femur, and thus the upper part of the femur is urged against the shaft of the femur. The screws may then be fully tightened and further screws to hold the shank firmly in position may be inserted.

The implants are preferably made of surgicallly acceptabel stainless steel, for example, the steel known as En 58J.

Specific embodiments of the invention will now be described with reference to the accompanying drawings of which:

FIGURE I is a perspective view, with the upper part of the femur partly cut away, of an osteotomy implant in position, FIGURE II is a sectional view showing one stage in the insertion of an ostetomy implant into a patient, and FIGURE III and IV are elevations showing further stages in the insertion of an osteotomy implant into a patient.

FIGURE V is a side elevation of an implant for use in the fixation of sub-trochanteric fractures, with the position of the bone shown by dotted lines.

FIGURE VI is a side elevation of an implant for use in the fixation of trochanteric fractures, with the position of the bone shown by dotted lines.

Referring to FIGURES I to IV, an osteotomy implant 1 has a head 2 for insertion into the upper part of the femur 3 and a shank 4 for attachment to the shaft of the femur 5. The head 2 is in the form of a neck 6 and a tri-fin tapered blade 7. The neck 6, where it joins the shank 4, is bent backwards from the shank 4 to give the correct alignment to the upper part of the femur 3 and the shaft of the femur 5 when they are joined together. The neck 6 has a threaded hole 8 into which is screwed a post 9 which is threaded at both its ends. A nut 10 is screwed on to the upper end of the post 9 and bears on the trochanter through a washer 11. The neck 6 has a hole 12 to receive an introducer 13. The shank 4 has two slots 14 and, below the lower slot, a locating hole 15. The shank 4 also has two holes 16 for receiving screws. The introducer 13 has a projecting stud 18 at one of its ends for insertion into the hole 12. The stud 18 also serves to carry a jig 19 which has a movable bush 20. A jig 21 which co-operates with the locating hole 15 has two bushes 22 located so that screws inserted through holes drilled using these bushes pass through the lower ends of the slots 14. A pre-loading device 23 has a stud 24 for insertion into the locating hole 15 and has a cam 25.

When a plate is being inserted into a patient, a guide wire 17 is inserted into the upper part of the femur 3 and its position checked with an X-ray. An implant 1 is attached to an introducer 13 and the head 2 of the implant is passed over the guide wire 17 and driven in to obtain the required location bq percussing the end of the introducer 13 remote from the implant 1. The jig 19 is then fitted into position on the introducer 13. The movable bush 20 is released and moved until it contacts the trochanter to gauge the length of hole and post which will be required. The movable bush 20 is re-locked and a hole is drilled into the trochanter down to the head 2 using the bush 20 as a guide. A post 9 is inserted through the bush 20 into the hole in the trochanter and is screwed into the threaded hole 8. The introducer 13, the jig 19 and the guide wire 17 are removed. The washer 11 and the nut 10 are placed over the post 9 and the nut 10 is screwed up. The jig 21 is then attached to the shank 4. The shaft of the femur 5 is aligned in the position required for re-union and the shank 4 is clamped to it. A hole is drilled through each of the bushes 22 and into the shaft of the femur 5. The jig 21 is removed and self-tapping screws are inserted through the slots 14 and into the holes drilled in the femur. They are tightened and then backed off half a turn. The stud 24 of the pre-loading device 23 is then inserted into the locating hole 15 so that the cam 25 rests against the head of the screw inserted through the lower of the slots 14. The pre-loading device 23 is turned so that the cam 25 presses against the screw pulling the two parts of the bone together. The screws inserted through the slots 14 are fully tightened and the preloading device 23 removed. Holes are then drilled through the holes 16 and into the shaft of the femur 5 and dowel screws are inserted through them. The nut 10 is then checked for tightness.

Referring now to FIGURE V, the implant for use in the fixation of sub-trochanteric fractures is largely similar to the implant described above, and the same reference numerals have been applied to corresponding parts. The neck 6, however, is not bent backwards from the shank 4 as the upper part of the femur 3 and the shaft of the femur 5 are not required to be off-set in this fixation. The fracture line is shown at 26. When the implant is being inserted into a patient it is necessary to drill a hole through the hard outer layer of bone of the upper part of the femur 3 for the insertion of the head 2. Otherwise the technique is similar to that for the insertion of an osteotomy implant, except that it is not always necessary to apply pre-loading.

Referring now to FIGURE VI, the same reference numerals have again been applied to corresponding parts. The implant does not have the threaded hole shown at 8 in FIGURE I. The neck 6 is longer, and is not bent backwards from the shank 4, and the blade 7 is shorter. The neck has a threaded hole 27 into which fits a threaded plug 28 which anchors a wire 29 passing round the greater trochanter. The main fracture line is shown at 30, and a subsidiary fracture line is shown at 31. When the implant is being inserted into a patient it is necessary to drill a hole through the hard outer layer of bone of the upper part of the femur for the insertion of the head 2. Pre-loading is not applied.

We claim:

1. A fixation implant for use in hip surgery comprising a first member having a shank for attachment to the shaft of the femur, said shank having an inner side for engaging the shaft of the femur and a head projecting at an oblique angle from the said shank in a direction which is from said inner side towards the neck of the femur when the implant is in position for insertion into the neck of the femur, said head having a screw-threaded hole passing into the said head through that surface of the said head which is nearer to the greater trochanter when the implant is in position and a second member comprising a post for insertion into the greater trochanter said post being screw-threaded at one of its ends and attached to said head by insertion of said screw-threaded end into said screw-threaded hole in said head in a manner to bear axial and transverse loads.

2. A fixation implant as claimed in claim 1 wherein the said head comprises a neck attached to the shank and a wedge-shaped blade attached to said neck at its end remote from said shank, the wider part of the said blade being that part adjacent to the said neck.

3. A surgical implant as claimed in claim 1 for use in combination with an introducer and a jig, the said head having a second hole for temporarily receiving said introducer therein, said introducer carrying said jig for enabling the drilling through of the trochanter to receive said post.

4. A fixation implant as claimed in claim 1 for use in combination with a pre-loading device wherein the shank includes a locating hole adapted to receive the preloading device, said pre-loading device being insertable into said locating hole and operable to urge the shaft of the femur against the upper part of the femur.

5. A fixation implant for use in hip surgery in combination with pre-loading means, said implant combination comprising:
   an implant having a shank for attachment to the shaft of the femur;
   a head attached to said shank for insertion into the upper part of the femur, said head having a screw-threaded hole passing into the said head through that surface of the said head which is nearer to the greater trochanter when the implant is in position;
   a post for insertion into the greater trochanter, said post being screw-threaded at one of its ends and attached to said head by insertion of said screw-threaded end into said screw-threaded hole in said head;
   said shank having a slot to enable the fastening of said shank to the femur;
   said shank also including a hole spaced from said slot in a direction remote from said head for receiving said pre-loading means;
   said pre-loading means including a peg and a cam eccentrically attached to said peg;
   said peg being positioned within said hole in said shank with the eccentric cam partially overlying said spaced slot;
   said cam being operable to pull the femur together.

6. A fixation implant for use in hip surgery in combination with pre-loading means, an introducer and a jig, said combination including:
   an implant having a shank for attachment to the shaft of the femur;
   a head attached to said shank for insertion into the upper part of the femur, said head having a screw-threaded hole passing into the said head through that surface of the said head which is nearer to the greater trochanter when the implant is in position;
   a post for insertion into the greater trochanter, said post being screw-threaded at one of its ends and attached to said head by insertion of said screw-threaded end into said screw-threaded hole in said head;
   said shank having a slot to enable the fastening of said shank to the femur;
   said shank also including a hole spaced from said slot in a direction remote from said head for receiving said pre-loading means;

said pre-loading means including a peg and a cam eccentrically attached to said peg;

said peg being positioned within said hole in said shank with the eccentric cam partially overlying said spaced slot;

said cam operable to pull the femur together;

said head including a neck attached to said shank and a wedge-shaped blade attached to said neck at its end remote from said shank, a wider part of the blade being that part adjacent to the neck;

said head further having a hole for temporarily receiving said introducer;

said introducer being positioned within said hole and carrying said jig for enabling the drilling through of the trochanter to receive said post.

7. For use in hip surgery with an introducer and a jig of the type wherein the introducer includes a projecting stud at one end for carrying the jig and an open passageway extending longitudinally and axially of the introducer and wherein the jig includes a generally L-shaped member and a movable bush for enabling the drilling through of a hole in the greater trochanter, a fixation implant comprising:

a shank for attachment to the shaft of the femur, said shank having an inner side for engaging the shaft of the femur;

a head attached to said shank and projecting at an oblique angle thereto in a direction which is from said inner side towards the neck of the femur when the implant is in position for insertion into the neck of the femur, said head having through that surface of the said head which is nearer to the greater trochanter when the implant is in position;

a post for insertion into the greater trochanter, said post being screw-threaded at one of its ends and attached to said head by insertion of said screw-threaded end into said screw-threaded hole in said head in a manner to bear axis and transverse loads;

said shank having a slot to enable the fastening of said shank to the femur;

said head further having a second hole for receiving the stud of said introducer therein.

8. For use in hip surgery with a preloading means of the type including a peg and a cam eccentrically attached to said peg, a fixation implant comprising:

a shank for attachment to the shaft of the femur, said shank having an inner side for engaging the shaft of the femur;

a head attached to said shank and projecting at an oblique angle thereto in a direction which is from said inner side towards the neck of the femur when the implant is in position for insertion into the neck of the femur, said bead having a screw-threaded hole passing into the said head through that surface of the said head which is nearer to the greater trochanter when the implant is in position;

a post for insertion into the greater trochanter, said post being screw-threaded at one of its ends and attached to said head by insertion of said screw-threaded end into said screw-threaded hole in said head in a manner to bear axial and transverse loads;

said shank having a slot to enable the fastening of said shank to the femur;

said shank also including a hole spaced from said slot in a direction remote from said head for receiving said pre-loading means wherein said cam is operable to pull the femur together.

9. For use in hip surgery with an introducer, a jig, and a pre-loading means of the types wherein the introducer includes a projecting stud at one end for carrying the jig and an open passageway extending longitudinally and axially of the introducer and wherein the jig includes a generally L-shaped member and a movable bush for enabling the drilling through of a hole in the greater trochanter and wherein the pre-loading means includes a peg and a cam eccentrically attached to the said peg, a fixation implant, comprising:

a shank for attachment to the shaft of the femur, said shank having an inner side for engaging the shaft of the femur;

a head attached to said shank and projecting at an oblique angle thereto in a direction which is from said inner side towards the neck of the femur when the implant is in position for insertion into the neck of the femur, said head having a screw-threaded hole passing into the said head through that surface of the said head which is nearer to the greater trochanter when the implant is in position;

a post for insertion into the greater trochanter, said post being screw-threaded at one of its ends and attached to said head by insertion of said screw-threaded end into said screw-threaded hole in said head in a manner to bear axial and transverse loads;

said shank having a slot to enable the fastening of said shank to the femur;

said shank also including a hole spaced from said slot in a direction remote from said head for receiving said pre-loading means wherein said cam is operable to pull the femur together;

said head further having a second hole for receiving the stud of said introducer therein.

10. A fixation implant for use in hip surgery in combination with pre-loading means, said combination comprising:

an implant having a shank for attachment to the shaft of the femur;

an elongated blade attached at the upper end of said shank and extending laterally therefrom for insertion into the upper part of the femur, said blade having a screw-threaded hole passing into the said blade through that surface of the said blade which is nearer to the greater trochanter when the implant is in position;

a post for insertion into the greater trochanter said post being screw-threaded at one of its ends and attached to said blade by insertion of said screw-threaded end into said screw-threaded hole in said blade in a manner to bear axial and tranverse loads;

sand shank having a slot adapted to enable the fastening of said shank to the femur;

said shank also including a hole spaced from said slot in a direction remote from said blade;

said pre-loading means including a peg and a cam eccentrically attached to said peg;

said peg being positioned within said hole with the eccentric cam partially overlying said spaced slot;

said cam being operable to pull the femur together.

11. For use in hip surgery with an introducer, a jig, a pre-loading means and a post of the types wherein the introducer includes a projecting stud at one end for carrying the jig and an open passageway extending longitudinally and axially of the introducer and wherein the jig includes a generally L-shaped member and a movable bush for enabling the drilling through of a hole in the greater trochanter and wherein the pre-loading means includes a peg and a cam eccentrically attached to said peg and wherein the post is adapted for insertion into the hole in the greater trochanter, a fixation implant comprising:

a shank for attachment to the shaft of the femur;

a shank for attachment to the shaft of the femur, said shank having an inner side for engaging the shaft of the femur;

a head attached to said shank and projecting at an oblique angle thereto in a direction which is from said inner side towards the neck of the femur when the implant is in position for insertion into the neck of the femur, said head having a screw-threaded hole passing into the said head through that surface of the said head which is nearer to the greater trochanter when the implant is in position;
said shank having a slot to enable the fastening of said shank to the femur;
said shank also including a hole spaced from said slot in a direction remote from said head for receiving said pre-loading means;
said head further having a second hole for receiving the stud of said introducer therein; and
said post being screw-threaded at one of its ends and adapted to be attached to said head by insertion of said screw-threaded end into said screw-threaded hole in said head in a manner to bear axial and transverse loads.

12. For use in hip surgery with a fixation implant of the type including a shank for attachment to the shaft of the femur, a head attached to said shank for insertion into the upper part of the femur, said shank having a slot to enable the fastening of said shank to the femur, said shank also having a hole spaced from said slot in a direction remote from said head, said head further having a hole, an insertion kit comprising:
an introducer having a projecting stud at one end and an open passageway extending longitudinally and axially therein;
a jig having a generally L-shaped member;
a movable bush attached to and in movable relationship with said jig for enabling the drilling through of a hole in the greater trochanter;
said projecting stud being shaped to carry said jig;
means including a peg and a cam eccentrically attached to said peg for pre-loading said implant, said pre-loading means operable to be inserted into said hole spaced from said slot, said cam positionable to pull the femur together; and
a post for insertion into the greater trochanter and firmly attachable by one of its ends to the head in a manner to bear axial and transverse loads.

References Cited

UNITED STATES PATENTS

| | | |
|---|---|---|
| 2,547,571 | 4/1951 | Ettinger. |
| 2,621,653 | 12/1952 | Briggs. |
| 2,874,691 | 2/1959 | Mason. |
| 3,244,170 | 4/1966 | McElvenny. |

FOREIGN PATENTS

| | | |
|---|---|---|
| 172,316 | 8/1952 | Austria. |

OTHER REFERENCES

Journal of Bone and Joint Surgery, October 1943, vol. 25, No. 4, Advertising page 2 (Moore-Blount Blade-Plates by Zimmer Mfg. Co.).

Vitallium Surgical Appliances, Catalog by Austenal Medical Division of Howmet Corp., printed in 1964, pages 41, 42, 45, 46 and 47 relied upon.

"An Osteotomy Fixation Plate," by G. Osborne, The Lancet, Dec. 19, 1964, pages 1315–1316.

RICHARD A. GAUDET, Primary Examiner

R. L. FRINKS, Assistant Examiner

U.S. Cl. X.R.

128—83